US012779584B2

(12) United States Patent
Gonzalez-Lee

(10) Patent No.: US 12,779,584 B2
(45) Date of Patent: Nov. 3, 2026

(54) GAS MIXER FOR CUTTING APPLICATIONS

(71) Applicant: MANUFACTURING SERVICE SOLUTIONS LIMITED, Rugby (GB)

(72) Inventor: Carlos Gonzalez-Lee, Rugby (GB)

(73) Assignee: Manufacturing Service Solutions Limited, Rugby (GB)

( * ) Notice: Subject to any disclaimer, the term of this patent is extended or adjusted under 35 U.S.C. 154(b) by 1352 days.

(21) Appl. No.: 17/557,680

(22) Filed: Dec. 21, 2021

(65) Prior Publication Data

US 2022/0193822 A1 Jun. 23, 2022

Related U.S. Application Data

(60) Provisional application No. 63/128,237, filed on Dec. 21, 2020.

(51) Int. Cl.
*B23K 26/12* (2014.01)

(52) U.S. Cl.
CPC .................................... *B23K 26/12* (2013.01)

(58) Field of Classification Search
CPC ............................... B01F 23/10; B01F 35/833
See application file for complete search history.

(56) References Cited

U.S. PATENT DOCUMENTS 4,874,116 A * 10/1989 Fallon .................. G05D 11/006 222/394
5,159,924 A * 11/1992 Cegielski ............ A61M 16/104 128/205.24
5,244,118 A * 9/1993 Fallon ....................... B67D 1/14 222/134
2008/0205471 A1 * 8/2008 Harrer .................. B23K 26/125 372/59
2008/0295842 A1 * 12/2008 Hete ...................... A61M 16/12 128/205.24

(Continued)

FOREIGN PATENT DOCUMENTS

CN 108355578 A * 8/2018
JP 2006341259 A * 12/2006 ............. B23K 26/14

OTHER PUBLICATIONS

Machine translation of CN-108355578-A, Jan. 2025 (Year: 2025).*

(Continued)

*Primary Examiner* — Ibrahime A Abraham
*Assistant Examiner* — Kevin Guanhua Wen
(74) *Attorney, Agent, or Firm* — Pauley Erickson & Swanson

(57) ABSTRACT

An apparatus for gas mixing for a laser and/or air cutting machine. The apparatus includes a housing including a first inlet for nitrogen, a second inlet for oxygen, and an outlet for a gas mixture of the nitrogen and oxygen. A mixing unit including a mixer manifold between and connected to the gas outlet and each of the first and second inlets, the mixer manifold including a plurality of blending valves. A digital controller adjusts the plurality of blending valves, to achieve an oxygen percent in the gas mixture from about 0.5% to about 22%. A first oxygen percent of below 10% is generally useful for a laser cutter, and a second oxygen percent above 20% is generally useful for an air cutter. The gas mixture is provided at a pressure of about 33 to 35 bar, and the apparatus operates without a pressure blending or buffer tank, or further compressor.

20 Claims, 5 Drawing Sheets

(56) References Cited

U.S. PATENT DOCUMENTS

2021/0275963 A1 9/2021 Gonzalez-Lee

OTHER PUBLICATIONS

Machine translation of CN-2006341259-A, Jan. 2025 (Year: 2025).*

Witt Gas Controls LP, "Gas Mixer MG 200-ME," Sales Sheet No. MG2 USA-J01/F, published at least as early as Oct. 2021(2 pp.).

Witt Gas Controls LT, "Gas Mixers—Your Gas Mixture—Just the Way You Need It To Be," Sales Catalog V_05/2021, published at least as early as Oct. 2021 (16pp.).

* cited by examiner

GAS MIXER FOR CUTTING APPLICATIONS

CROSS REFERENCE TO RELATED APPLICATION

This application claims the benefit of U.S. Provisional Patent Application Ser. No. 63/128,237, filed on 21 Dec. 2020. The provisional application is hereby incorporated by reference herein in its entirety and is made a part hereof, including but not limited to those portions which specifically appear hereinafter.

BACKGROUND OF THE INVENTION

This invention relates generally to air processing technology, and more particularly, to an apparatus and method for gas mixing, such as for air and laser cutting.

Laser technology is used for thermal machining processes, such as for welding or cutting metals. Laser cutting systems often use a nitrogen gas ($N_2$) source for high quality operation. Gas mixtures are also often important in laser processes. Gas mixers are used in conjunction with laser cutting systems and laser welding systems, and the quality of the gas mixtures is important. There is a continuing need for improved gas mixing.

SUMMARY OF THE INVENTION

The invention includes an apparatus for gas mixing in a compact unit that produces an oxygen and nitrogen mix. The invention further includes an apparatus and method for gas mixing and/or producing pressurized gas without a blending or buffer tank, or any compressor, in a compact unit.

The present invention includes a self-contained, plug-n-play gas mixer suitable for industrial applications, and which can be pre-set to suit the end user's specifications and needs. The gas mixer is compatible with various laser machines, and can provide standard nitrogen or mixed nitrogen and oxygen.

In embodiments of this invention, the apparatus can provide two or more of: pure nitrogen, a nitrogen and oxygen mix at low oxygen levels (e.g., <10%) such as for laser cutting, and a nitrogen and oxygen mix at higher oxygen levels (e.g., 21-22%) to mimic/provide air for air cutting, without a blending or buffer tank, or any compressor, and in a compact unit.

Embodiments of this invention provide real-time changes in gas mixes, with no mixing vessel (e.g., blending tank) required for the mix gas. The invention can incorporate an in-built oxygen analyzer, and/or an external remote operator control to select the appropriate gas and/or gas mixture.

Embodiments of this invention include an apparatus for gas mixing for a cutting machine. The apparatus includes a housing with a first inlet for a first gas, a second inlet for a second gas, the second gas different from the first gas, and an outlet for a gas mixture of the first and second gases. A mixing unit of the apparatus includes a mixer manifold between and connected to the gas outlet and each of the first and second inlets, the mixer manifold including a plurality of blending valves. A digital controller is used for adjusting the plurality of blending valves. The apparatus provides the gas mixture to the cutting machine directly, without a pressure blending or buffer tank, through the outlet.

Embodiments of this invention include a mixing unit, such as embodied with or as a mixing panel. The mixing panel is designed to mix two gases by means of pre-set gas mixers, and supply the resulting mixed gas into a pipeline distribution system. The mixing panel is fitted with two or more mixing valves, depending on the capacity. The gas mixers desirably work on a pressure balance principle with an interlock so that both inlet gases must be present for there to be a mixed gas output. Each mixer can be configured internally to suit the particular gas application and mix required from the system. Gas mixing valve outlets are manifolded together where necessary to provide the correct gas flow for the panel design. The mixing unit has a pressure regulator fitted to the mixed gas outlet. This is, for example, adjustable 0 to 35 bar to suit the output device, e.g., laser cutting machine, inlet pressure requirements. The inlet N2 pressure is typically equal to or no more than 2 bar higher than the O2 pressure.

In embodiments of this invention, the mixer manifold includes a plurality of divided gas lines for each of the first and second gasses. The divided gas lines lead to corresponding blending valves.

In embodiments of this invention, the first inlet is connected to the mixer manifold by a first gas line, and the second inlet is connected to the mixer manifold by a second gas line, and each of the first and second gas lines includes an inlet regulator.

In embodiments of this invention, the mixing unit includes a stepper motor assembly in combination with the plurality of blending valves. The digital controller is configured to operate the stepper motor to adjust an opening level of each of the plurality of blending valves. The mixing unit can also include an adjustable purity gauge configured to set a predetermined gas percent. Embodiments of the apparatus include a gas analyzer at (e.g., near) the outlet. The gas analyzer sends gas percent readings of the first and/or second gas in the gas mixture to the controller. The controller displays the gas percent readings through a control panel on the housing, and receives adjustments of the first and/or second gas percent through the control panel.

In embodiments of this invention, the first gas is pure filtered nitrogen and the second gas is pure filtered oxygen, and an oxygen percent in the mixed gas is adjustable from about 0.5% to about 22%. The mixed gas is desirably provided at a pressure of 30 to 35 bar (435 to 508 psi), and more desirably at 34 to 35 bar (493-508 psi).

The gases supplied to the apparatus should be clean, dry and fully vaporized. In embodiments of this invention, N2 pressure should be set 15-29 psi higher than O2. As an example, if the inlet oxygen pressure is 435 psi, then the nitrogen pressure can be 450-470 psi. In embodiments of this invention, the mixing unit has a pressure regulator fitted to the mixed gas outlet, which is desirably adjustable between 0 to 508 psi to suit the laser cutting machine inlet pressure requirements.

In embodiments of this invention, a mixer bypass line also connects the first inlet to the outlet, without going through the mixer. Solenoid valves can be used to alternate between the mixing unit and the mixer bypass line. A user switch can be provided to alternate between the mixing unit and the mixer bypass line.

The invention further includes a method for gas mixing without a blending or buffer tank and in a compact housing. The method includes: receiving a first gas flow through a first gas inlet and a different second gas flow through a second gas inlet; receiving a predetermined second gas percent for a mixing unit; mixing the first and second gas flows in the mixing unit according to the predetermined second gas percent; analyzing with a controller the second gas percent of a gas mixture in an outlet line from the mixing unit; displaying the second gas percent from the controller on a display panel of the compact housing; and receiving digital adjustments of the second gas percent for the mixing unit through the display panel. The mixing unit, controller, and display panel, and desirably all components discussed above, are contained on or in the compact housing. The first gas flow can be pure filtered nitrogen and the second gas flow can be pure filtered oxygen, and an oxygen percent in the gas mixture is adjustable from about 0.5% to about 22%.

The method further includes outputting the gas mixture, such as a N2/O2 mix to a cutting machine, such as a laser cutter at 7% O2 and/or an air cutter at 22% O2. An outlet pressure is desirably set according to a pressure requirement of the cutting machine. In embodiments of this invention, a first oxygen percent of below 10% is for a laser cutter, and a second oxygen percent above 20% is for an air cutter, and the gas mixture is provided at a pressure of about 33 to 35 bar.

The method can include bypassing the mixer to output only the first gas flow (e.g., N2) or the second gas flow, such as by a switch on the compact housing alternates between the mixing unit and the bypassing.

Other objects and advantages will be apparent to those skilled in the art from the following detailed description taken in conjunction with the appended claims and drawings.

DETAILED DESCRIPTION OF THE INVENTION

The present invention provides a compact apparatus and method for providing pressurized gas and/or gas mixes, such as for cutting devices.

Figure 1:
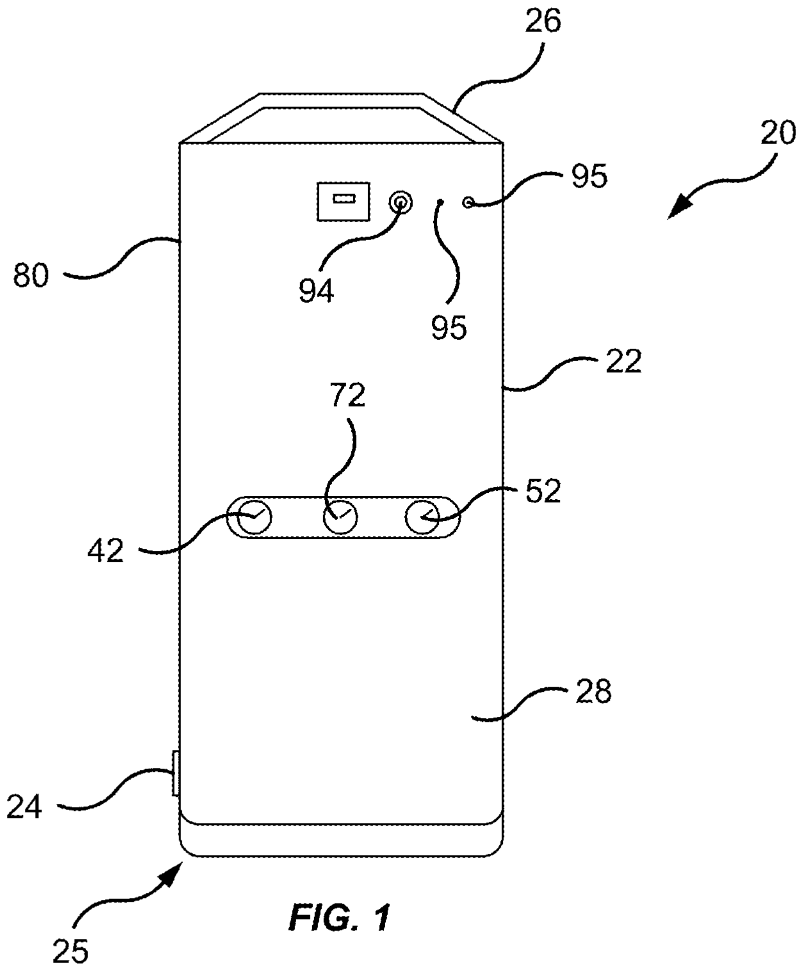
FIGS. 1-3 show a gas mixer apparatus according to one embodiment of this invention.
Figure 2:
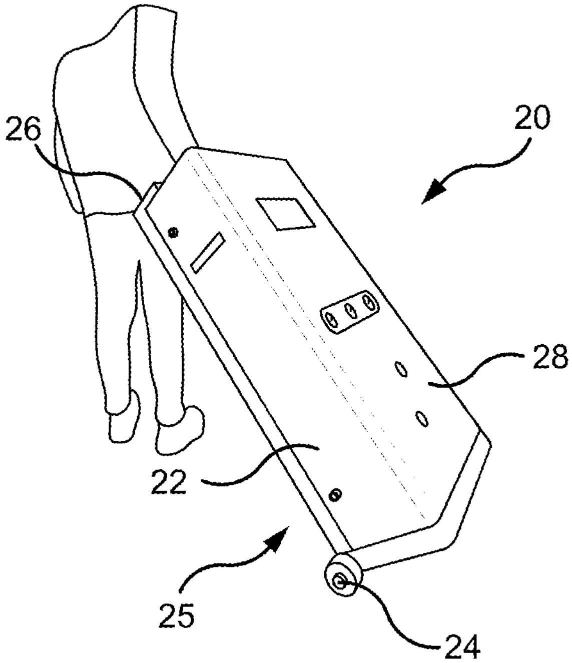

FIG. 1 shows an apparatus 20 for gas mixing, such as for a cutting machine. The apparatus includes a housing 22. The housing 22 is desirably compact to be easily transported. In embodiments of this invention, the housing is less than five feet high, more desirably less than four feet high, and having a length×width of about 3×2 feet or less, desirable about 2×1 feet. As shown in FIGS. 1 and 2 the housing 22 includes wheels 24 and an upper handle 26 for easy transport. In the illustrated embodiment the wheels 24 are part of a hand truck attachment 25 for, and connected to the housing 20. The housing 20 can further include a door 28 to access the mixing unit and/or other internal components, such as for setting and/or changing initial gas pressures.

Figure 3:
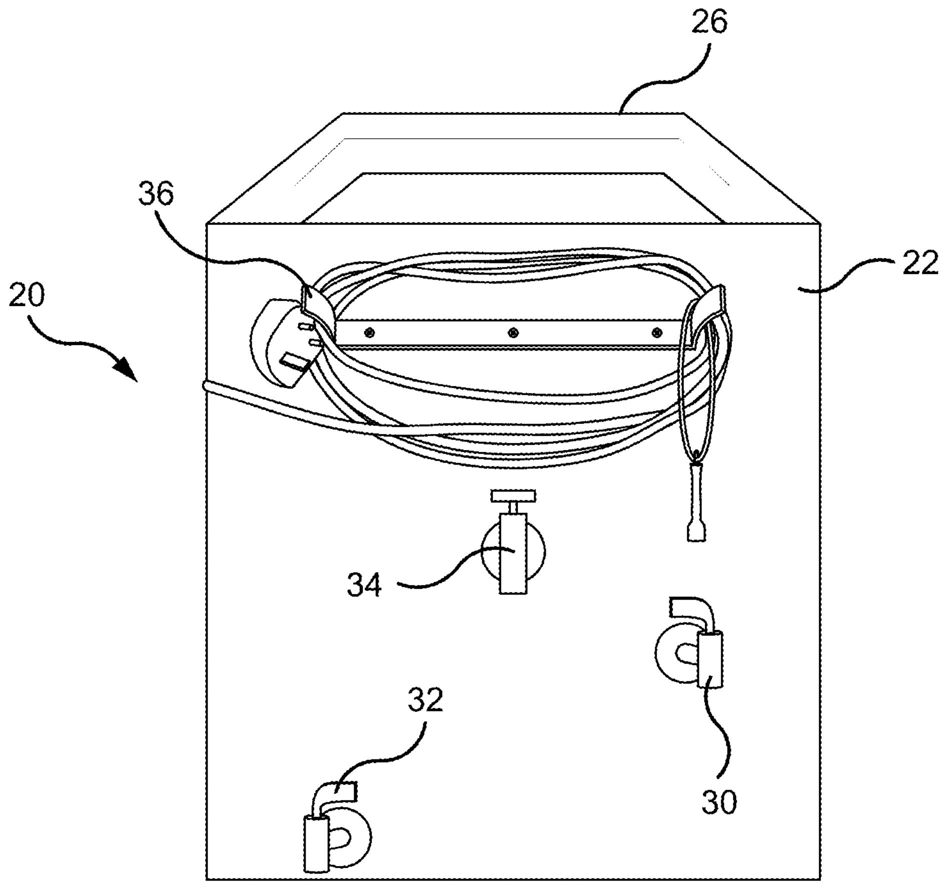

As shown in FIG. 3, the housing 20 includes access points for gas hookups. FIG. 3 shows a first inlet 30 for a first gas, a second inlet 32 for a second gas, the second gas being different from the first gas, and an outlet 34 for the outlet gas, such as a gas mixture of the first and second gases. In embodiments of this invention, the first gas is nitrogen and the second gas is oxygen, as described hereinafter, each desirable pure and filtered before entering the apparatus 20. FIG. 3 also shows a power cord 36 for plug-in power, such as to a standard electrical receptacle.

Figure 5:
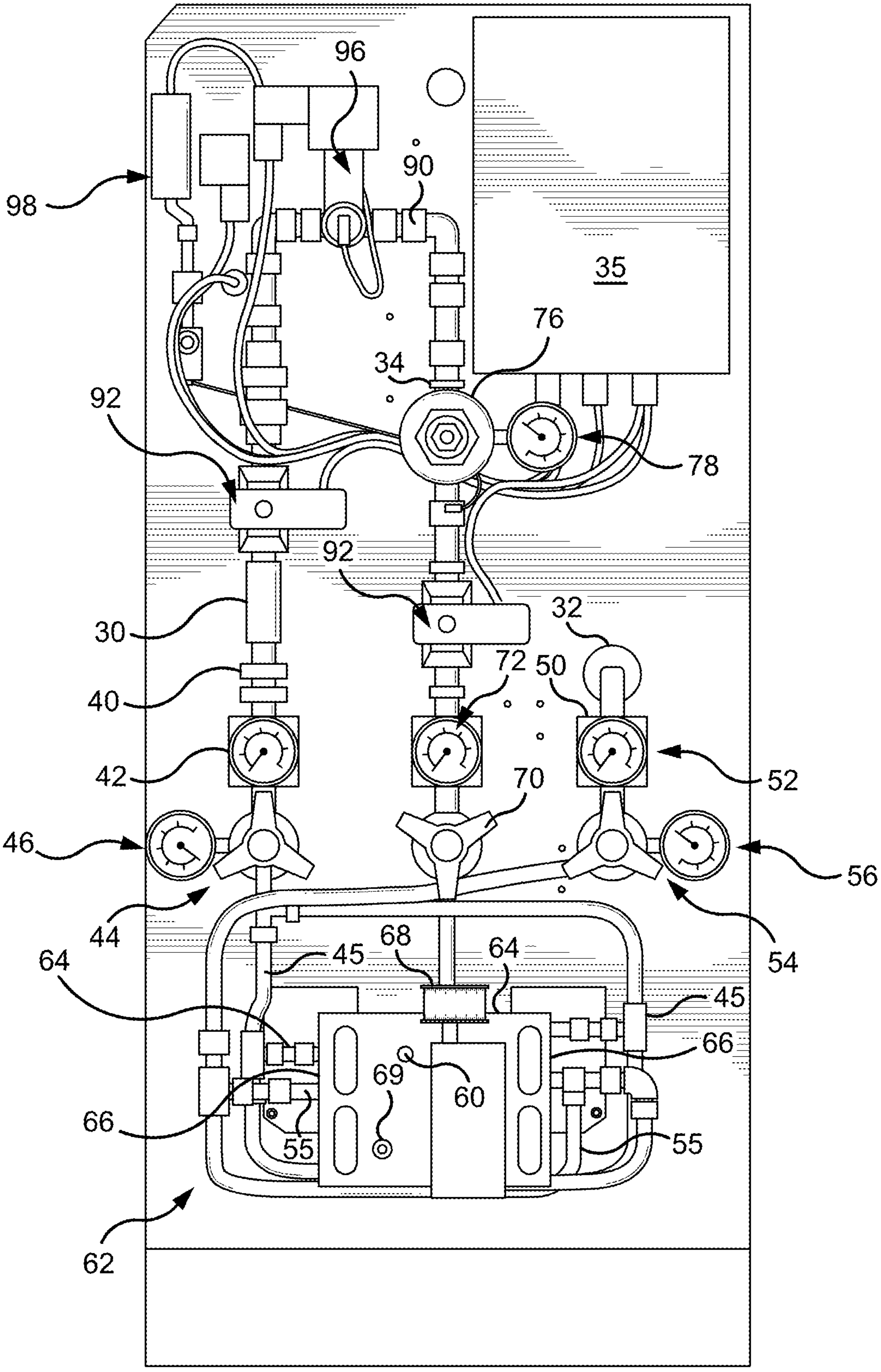
FIG. 5 shows internal components and a mixing panel for the apparatus of FIG. 1, according to one embodiment of this invention.

FIG. 5 shows the internal components of the housing 20, according to one embodiment of this invention. A power supply unit 35 is connected to the cord 36 for power operation of the apparatus components. Nitrogen line 40 extend from the first inlet 30 to a mixing unit 60. Oxygen line 50 extends from the second inlet 32 to the mixing unit 60. Nitrogen line 40 includes a nitrogen inlet pressure gauge 42 for showing the nitrogen gas pressure from the nitrogen source (not shown). Oxygen line 50 similarly includes an oxygen inlet pressure gauge 52 for showing the oxygen gas pressure from the oxygen source (not shown). Nitrogen line 40 further includes an adjustable nitrogen pressure regulator 44, with a downstream pressure gauge 46 to show the nitrogen pressure to the mixing unit 60. Oxygen line 50 further includes an adjustable oxygen pressure regulator 54, with a downstream pressure gauge 56 to show the oxygen pressure to the mixing unit 60.

The mixing unit 60 includes a mixer manifold 62 between the gas outlet 34 and each of the first and second inlets 30, 32. The mixer manifold 62 includes a plurality of divided nitrogen gas lines 45 separating the nitrogen flow to a plurality of blending valves 64. The mixer manifold 62 includes a plurality of divided oxygen gas lines 55 separating the oxygen flow to a second plurality of blending valves 66. The mixing unit 60 includes a purity set point/adjustment dial gauge 68 and adjustment dial 69 to set and/or adjust the oxygen content in the mixed gas. In embodiments of this invention the mixing unit 60 includes a motor, for example a stepper motor assembly, in combination with the plurality of blending valves for digital control of the oxygen/nitrogen ratio.

The mixed gas from the mixing unit 60 flows to an adjustable mixed gas outlet regulator 70, including a mixed gas outlet gauge 72, configured to be set according to a pressure requirement of the downstream, external cutting machine. The mixed gas outlet 34 desirably includes an oxygen analyzer 76, with a further analyzer pressure gauge 78.

Embodiments of this invention include a control device for digital and/or automated control of and in communication with the mixing unit, regulators, etc. The control device includes a processor and recordable medium including software coded steps to control operation based upon user inputs. As shown in FIG. 1, the housing includes a control panel 80 that allows a consumer user to adjust the oxygen/nitrogen ratio. The control device is configured to adjust the plurality of blending valves 64 and/or 66, such as though operating the stepper motor to adjust an opening level of each of the plurality of blending valves 64, 66. In embodiments of this invention, the analyzer 76 can send gas percent readings of the oxygen and/or nitrogen in the gas mixture to the controller. The controller displays the gas percent readings through the control panel 80 on the housing, and receives adjustments of the first and/or second gas percent through the control panel 80.

Figure 4:
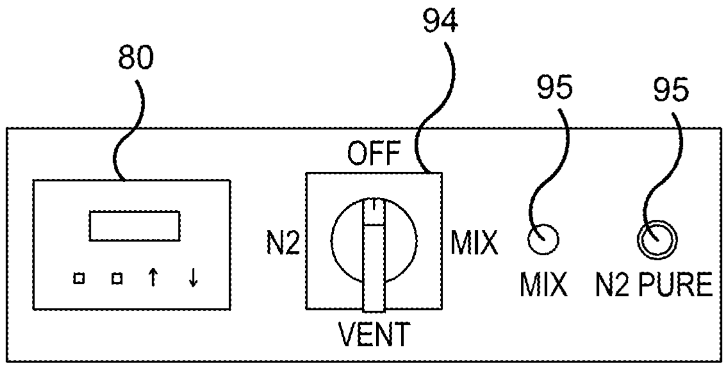
FIG. 4 shows a control panel for the embodiment of FIG. 1, according to one embodiment of this invention.

In embodiments of this invention, the apparatus includes a mixer bypass line connecting one of the gas sources directly to the outlet. In such embodiments, the apparatus can alternatively provide pure gas or mixed gas, depending on need. In FIG. 5, the apparatus 20 includes nitrogen bypass line 90 extending from the nitrogen inlet 30 to the outlet 34. A plurality of solenoid valves 92 can be controlled to alternate between the mixing unit 60 and the mixer bypass line 90. The apparatus can include an external selector switch to set for mixing operation. FIGS. 1 and 4 shows a user switch 94 to alternate between the mixing unit 60 ("Mix") and the mixer bypass line 90 ("N2"). Display lights 95 can further illuminate to indicate the current state of operation. The bypass line 90 can further include a purge solenoid 96 to purge the bypass line 90 and/or the full system, and an optional oxygen analyzer 98 to monitor the contents of the bypass line 90 and/or any purge.

In embodiments of this invention, using the mixing apparatus 20 includes attaching each of the gas inlets 30, 32 to the corresponding gas source. The air is purged from the system to, for example, the atmosphere. The inlet pressures are set at the regulators 44 and 54. The mixed gas output is generally lower than the nitrogen inlet pressure, and needs to be taken into account at this step. The system can then be powered, and the selection of the gas type made (N2 or mix). The pressures can be adjusted after starting by the regulators 44, 54, 70. Then the outlet O2 purity content is set by the adjustment nob 69 and dial gauge 68. The nob 69 is turned clockwise to increase purity percent or counter-clockwise to reduce purity percent. This reading is generally used only as reference value, and is validated on display panel 80. The display panel 80 then allows for tuning of the oxygen content.

Figure 6:
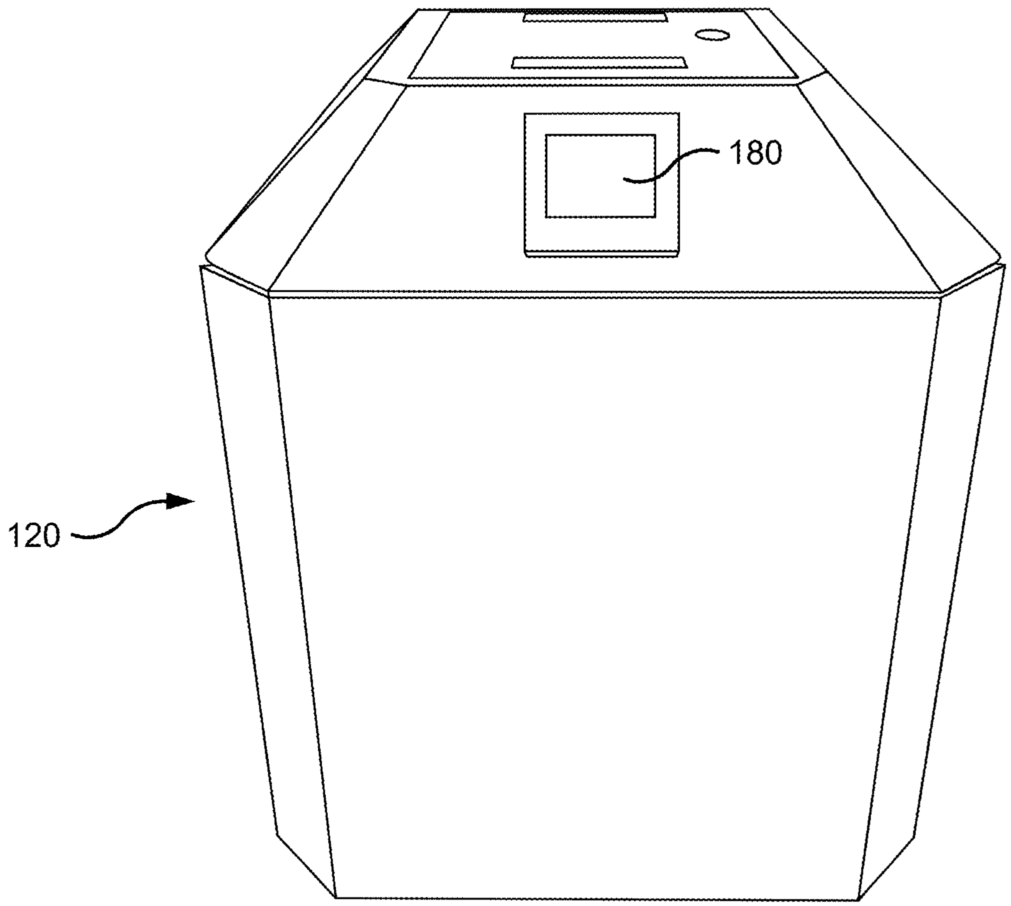
FIG. 6 shows a gas mixer apparatus according to one embodiment of this invention.
Figure 7:
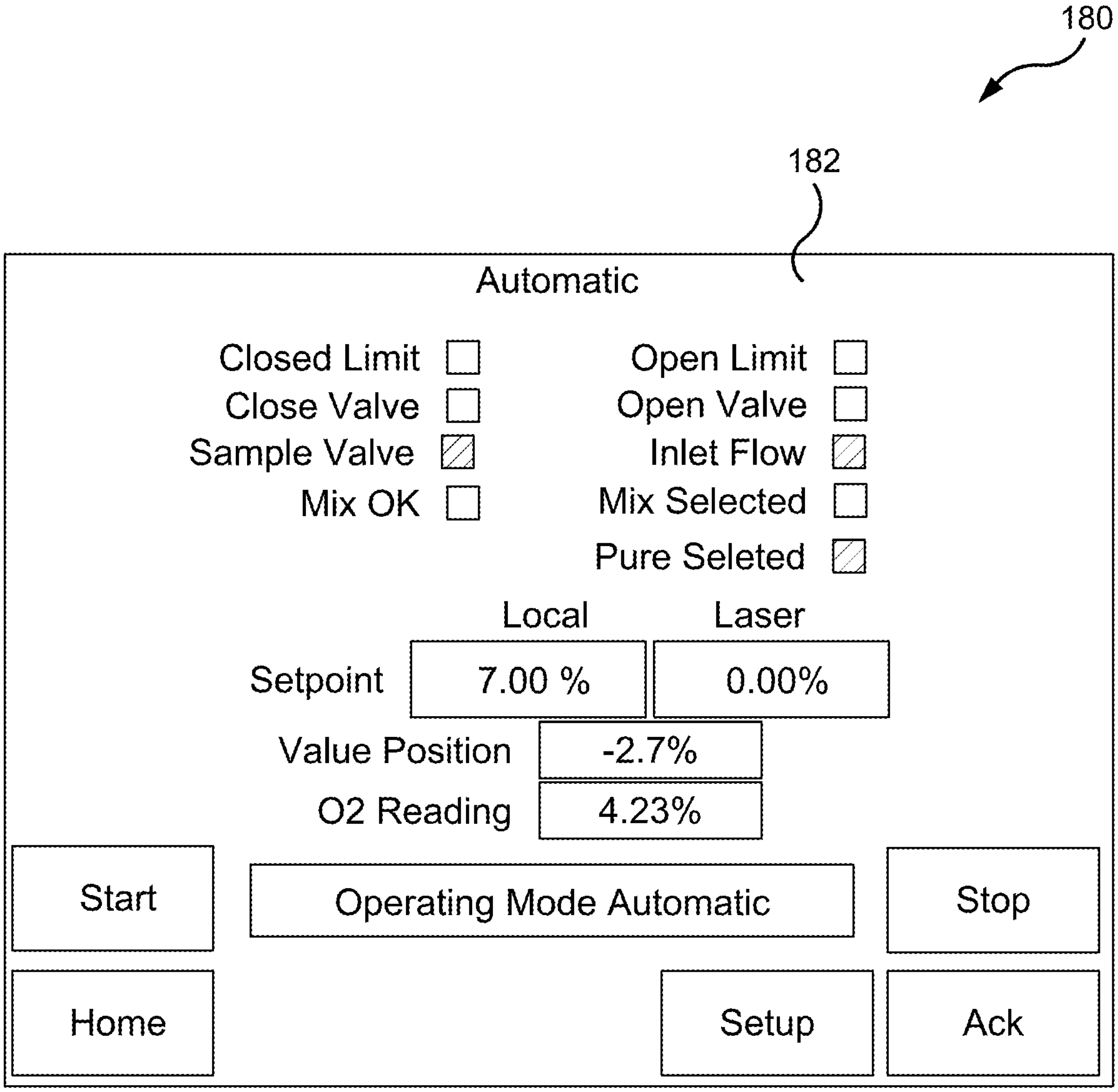
FIG. 7 shows a display panel of the apparatus of FIG. 6.

FIG. 6 shows a gas mixer 120 according to another embodiment of this invention. The gas mixer 120 operates in a comparable manner as described above, except is fully digital/electronically controlled. Sensors can be used with or in place of gauges to provide gas mixing information for automated control. A control panel 180 is used for operations such as gas mixing, including changes in oxygen percentages, and switching to a single gas. FIG. 7 shows an exemplary graphical user interface 182 of the control panel 180. The touchscreen allows for setting and adjusting the oxygen setpoint percent, and shows/allows selection of other operating states. The control device then adjusts the internal mixing unit to provide the requested output gas.

The mixing devices of this invention provide real-time purity mix changes, which is compatible with any laser machine without internal or external mixing/buffer vessel tanks. For air cutting at higher oxygen contents, the device operational cutting pressures of up to 35 bar without additional compressors or boosters, and works with high pressure cutting at flowrates, for example, from 3500 Scfh to 5250 Scfh.

Thus, the invention provides a space-efficient gas mixer for industrial processes such as air and laser cutting. The mixer of this invention provides enhanced edge quality, real-time purity mix changes, all in a compact, plug-and-play, machine.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for gas mixing for a cutting machine, the apparatus comprising:

a housing including a first inlet for a first gas, a second inlet for a second gas, the second gas different from the first gas, and an outlet for a gas mixture of the first and second gases;

a mixing unit including a mixer manifold between and connected to the gas outlet and each of the first and second inlets, the mixer manifold including a plurality of blending valves;

a digital controller for adjusting the plurality of blending valves;

wherein the apparatus provides the gas mixture to the cutting machine directly, without a pressure blending or buffer tank, through the outlet.

2. The apparatus of claim 1, wherein the mixer manifold includes a plurality of divided gas lines for each of the first and second gasses.

3. The apparatus of claim 1, wherein the first inlet is connected to the mixer manifold by a first gas line, and the second inlet is connected to the mixer manifold by a second gas line, and further comprising:

each of the first and second gas lines including an inlet regulator.

4. The apparatus of claim 1, wherein the mixing unit comprises a stepper motor assembly in combination with the plurality of blending valves, and the digital controller is configured to operate the stepper motor to adjust an opening level of each of the plurality of blending valves.

5. The apparatus of claim 4, wherein the mixing unit comprises an adjustable purity gauge configured to set a predetermined gas percent.

6. The apparatus of claim 5, wherein the outlet comprises a gas analyzer, wherein the gas analyzer sends gas percent readings of the first and/or second gas in the gas mixture to the controller, wherein the controller displays the gas percent readings through a control panel on the housing, and receives adjustments of the first and/or second gas percent through the control panel.

7. The apparatus of claim 6, wherein the first gas is pure filtered nitrogen and the second gas is pure filtered oxygen, and an oxygen percent in the mixed gas is adjustable from about 0.5% to about 22%.

8. The apparatus of claim 7, wherein the mixed gas is provided at a pressure of 30 to 35 bar.

9. The apparatus of claim 1, wherein the outlet comprises a pressure regulator configured to be set according to a pressure requirement of the cutting machine.

10. The apparatus of claim 1, further comprising a mixer bypass line connecting the first inlet to the outlet.

11. The apparatus of claim 10, further comprising a user switch to alternate between the mixing unit and the mixer bypass line.

12. The apparatus of claim 10, further comprising a plurality of solenoid valves to alternate between the mixing unit and the mixer bypass line.

13. A method for gas mixing without a blending or buffer tank and in a compact housing, the method comprising:

receiving a first gas flow through a first gas inlet and a different second gas flow through a second gas inlet;

receiving a predetermined gas percent for a mixing unit;

mixing the first and second gas flows in the mixing unit according to the predetermined gas percent;

analyzing with a controller the gas percent of a gas mixture in an outlet line from the mixing unit;

displaying the gas percent from the controller on a display panel of the compact housing; and receiving digital adjustments of the gas percent for the mixing unit through the display panel.

14. The method of claim 13, wherein the mixing unit, controller, and display panel are contained in the compact housing.

15. The method of claim 13, further comprising outputting the gas mixture to a cutting machine.

16. The method of claim 15, further comprising setting an outlet pressure according to a pressure requirement of the cutting machine.

17. The method of claim 13, further comprising bypassing the mixer to output only the first gas flow or the second gas flow.

18. The method of claim 17, wherein a switch on the compact housing alternates between the mixing unit and the bypassing.

19. The method of claim 13, wherein the first gas flow is pure filtered nitrogen and the second gas flow is pure filtered oxygen, and an oxygen percent in the gas mixture is adjustable from 0.5% to 22%.

20. The method of claim 19, wherein a first oxygen percent of below 10% is for a laser cutter, and a second oxygen percent above 20% is for an air cutter, and the gas mixture is provided at a pressure of 33 to 35 bar.

* * * * *